April 1, 1924.

W. WENCIKER

BEARING FOR CRANK SHAFTS

Filed Dec. 30. 1922

1,489,185

INVENTOR
Walt Wenciker,
BY James Sheely & Co.,
ATTORNEYS

Patented Apr. 1, 1924.

1,489,185

UNITED STATES PATENT OFFICE.

WALT WENCIKER, OF TAMORA, NEBRASKA.

BEARING FOR CRANK SHAFTS.

Application filed December 30, 1922. Serial No. 609,945.

*To all whom it may concern:*

Be it known that I, WALT WENCIKER, a citizen of the United States, residing at Tamora, in the county of Seward and State of Nebraska, have invented new and useful Improvements in Bearings for Crank Shafts, of which the following is a specification.

My present invention pertains to internal combustion engines and it contemplates the provision of a device adapted to be secured immediately in rear of the fan wheel pulley on a crank shaft of a Ford motor (preferably) through the medium of which the fly wheel will at all times contact with the magneto elements to cause a steady spark.

The invention is particularly adapted for use on a shaft of a motor that has its fly wheel spaced to a great extent from the magneto elements due to wear and usage.

The invention in all of its details will be fully understood from the following description when the same are read in connection with the drawings accompanying and forming part of this specification, in which:—

Similar numerals of reference designate corresponding parts in all the views of the drawings.

Figure 1:
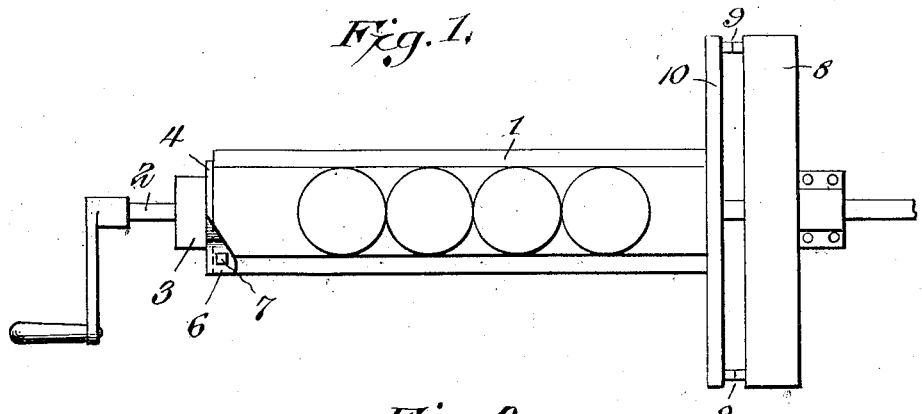
Figure 1 is a side elevation of a motor and its appurtenances and equipped with my invention.
Figure 2:
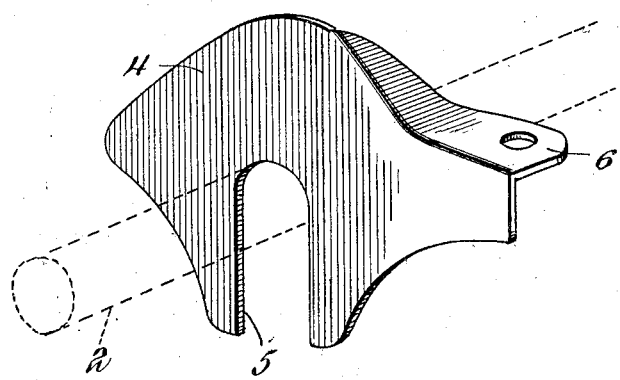
Figure 2 is a perspective view of the device and showing the crank shaft in dotted line.

My novel device may be formed of various thickness and comprises the plate 4 having an opening 5 that fits over the crank shaft 2 and it is further provided with a bolt hole opening 6 in its upper bent end.

The device is preferably of the configuration shown and straddles the shaft 2 immediately in rear of fan belt pulley 3.

A bolt 7 passes through the hole 6 of the device 4 and is employed to fasten the said device to the face of the cylinder casing 1.

It will be manifest that the plate 4 placed at the point shown forces, when the fan belt is adjusted on the shaft 2, the element 9 of the fly wheel 8 against the magneto portion 10 and thus producing a vital spark.

The device may either be placed on new as well as old cars but is particularly adapted to be arranged on an old car in which constant wear prevents the elements 9 from contacting with the elements 10 to produce spark.

The device is extremely inexpensive to produce and may be secured to a motor with a small amount of effort and without skilled labor.

It also provides a perfect guide for the fan belt and assures a constant and steady spark notwithstanding the age of the motor.

Having described my invention, what I claim and desire to secure by Letters Patent is:—

In a crank shaft bearing, the combination of a thin plate formed of a single piece of material and having a longitudinal slot that is open from the lower end of the plate to approximately the center thereof; said plate having one of its upper edges bent and having an aperture formed in the bent portion.

In testimony whereof I have hereunto set my hand in presence of two subscribing witnesses.

WALT WENCIKER.

Witnesses:
B. F. NORVAL,
R. R. MASTIN.